(12) United States Patent
Joshi et al.

(10) Patent No.: US 8,214,393 B2
(45) Date of Patent: Jul. 3, 2012

(54) INTEGRATING DATABASE DEPLOYMENT WITH CODE DEPLOYMENT

(75) Inventors: Vishal R. Joshi, Redmond, WA (US); Joseph M. Davis, Issaquah, WA (US); Yugang Wang, Redmond, WA (US); Xinyang Qiu, Vancouver (CA)

(73) Assignee: Microsoft Corporation, Redmond, WA (US)

( * ) Notice: Subject to any disclaimer, the term of this patent is extended or adjusted under 35 U.S.C. 154(b) by 350 days.

(21) Appl. No.: 12/579,413

(22) Filed: Oct. 15, 2009

(65) Prior Publication Data

US 2011/0093513 A1    Apr. 21, 2011

(51) Int. Cl.
*G06F 17/30* (2006.01)
*G06F 7/00* (2006.01)

(52) U.S. Cl. ..................................... 707/780

(58) Field of Classification Search .................. 707/804, 707/780
See application file for complete search history.

(56) References Cited

U.S. PATENT DOCUMENTS

| | | | |
|---|---|---|---|
| 7,617,175 B1* | 11/2009 | Mouton et al. | 707/999.001 |
| 7,765,226 B2* | 7/2010 | Dettinger et al. | 707/768 |
| 7,810,069 B2* | 10/2010 | Charisius et al. | 717/110 |
| 2004/0199636 A1 | 10/2004 | Brown et al. | |
| 2008/0005077 A1* | 1/2008 | Eggebraaten et al. | 707/999.003 |
| 2008/0016186 A1 | 1/2008 | Ball | |
| 2010/0058041 A1* | 3/2010 | John et al. | 713/2 |

OTHER PUBLICATIONS

Joshi, Vishal, "Web 1-Click Publish with VS 2010", retrieved at <<http://vishaljoshi.blogspot.com/2009/05/web-1-click-publish-with-vs-2010.html>>, May 31, 2009, pp. 17.
Appel, Rachel, "New ASP.NET Web Deployment Options in Visual Studio", retrieved at <<http://rachelappel.com/visual-studio/visual-studio-2010/new-asp-net-web-deployment-options-in-visual-studio/>>, Nov. 13, 2008, pp. 4.
"ORCS Web Successfully Launches Visual Studio 2010 and Web Deployment Tool Beta Program", retrieved at <<http://directory.findmyhost.com/2009/06/orcs-web-successfully-launches-visual-studio-2010-and-web-deployment-tool-beta-program/>>, Jun. 3, 2009, pp. 5.
"ASP.NET Web Application Projects Deployment Overview", retrieved at <<http://msdn.microsoft.com/en-us/library/dd394698(VS.100).aspx>>, 2009, pp. 4.
"Free Web Hosting for Visual Studio 2010 and .NET 4.0", retrieved at <<http://www.kvchosting.com/hosting-news/72/free_web_hosting_for_visual_studio_2010_and_net_4_0.html>>, 2009, pp. 3.
"ASP.NET 4.0 and Visual Studio 2010 Web Development Beta 1 Overview", retrieved at <<http://www.dotnetoutsource.com/Articles/ASP-NET-4-0-and-Visual-Studio-2010-Web-Development-Beta-1-Overview.aspx>>, 2009, pp. 26.
"Custom Flash Web Design", retrieved at <<http://www.mmksecurestream.com/custom_flash_web_design.aspx>>, Sep. 14, 2009, pp. 20.
"ASP.NET Web Deployment Overview", retrieved at <<http://msdn.microsoft.com/en-us/library/bb398992(VS.100).aspx>>, Sep. 14, 2009, pp. 3.

* cited by examiner

*Primary Examiner* — Sathyanarayan Pannala (57) ABSTRACT

Aspects of the subject matter described herein relate to integrated database deployment. In aspects, code corresponding to a software project and data that encodes database operations are placed in a deployment package. When executed in a first environment such as a development environment, the code is arranged to access a first database of the first environment. The database operations indicated in the package may be used to create and/or update a second database of a target entity such that the second database is consistent for use by the code after the code is installed on the target entity.

20 Claims, 6 Drawing Sheets

INTEGRATING DATABASE DEPLOYMENT WITH CODE DEPLOYMENT

BACKGROUND

In developing an application, a developer will often have a test database with which the application may interact. The test database may be associated with a schema that specifies a structure of the database. The test database may also include various data. For example, test data may be used to test the application against the database to ensure proper operation of the application. For example, a developer may create test employee data in the database to assist the developer in testing various features of the application. Transferring test data to a production environment, however, may be undesirable.

Other data, on the other hand, may be needed by the application to execute correctly, whether the application is interacting with a test database or a production database. For example, a sales application may need state abbreviations or a particular column in a table. Ensuring that an application and appropriate schema information and data from its database are deployed correctly is a challenge.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to integrated database deployment. In aspects, code corresponding to a software project and data that encodes database operations are placed in a deployment package. When executed in a first environment such as a development environment, the code is arranged to access a first database of the first environment. The database operations indicated in the package may be used to create and/or update a second database of a target entity such that the second database is consistent for use by the code after the code is installed on the target entity.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment." Other definitions, explicit and implicit, may be included below.

Exemplary Operating Environment

Figure 1:
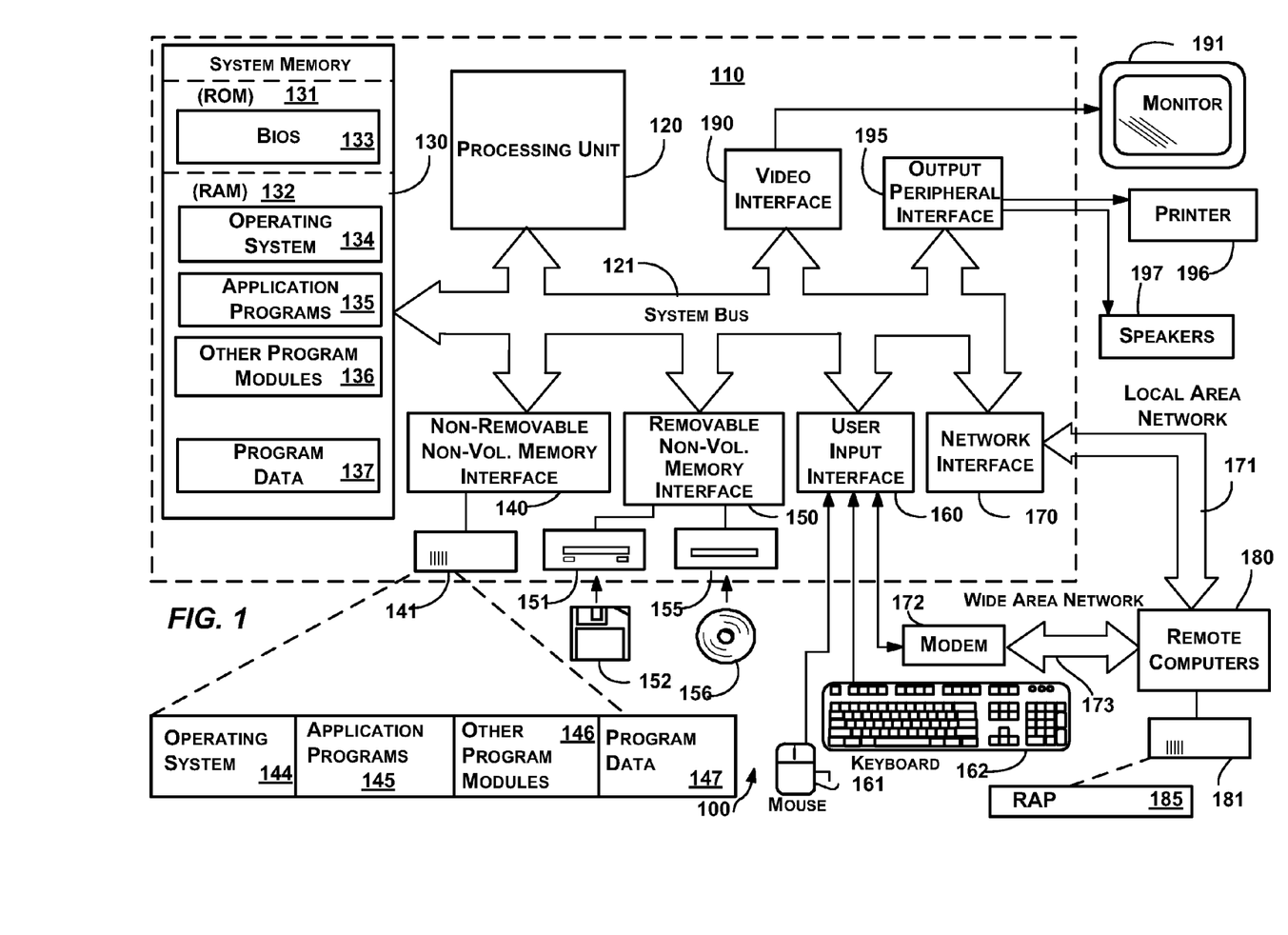
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, or configurations that may be suitable for use with aspects of the subject matter described herein comprise personal computers, server computers, hand-held or laptop devices, multiprocessor systems, microcontroller-based systems, set-top boxes, programmable consumer electronics, network PCs, minicomputers, mainframe computers, personal digital assistants (PDAs), gaming devices, printers, appliances including set-top, media center, or other appliances, automobile-embedded or attached computing devices, other mobile devices, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. A computer may include any electronic device that is capable of executing an instruction. Components of the computer 110 may include a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media.

Computer storage media includes both volatile and nonvolatile, removable and non-removable media implemented in any method or technology for storage of information such as computer-readable instructions, data structures, program modules, or other data. Computer storage media includes RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include magnetic tape cassettes, flash memory cards, digital versatile discs, other optical discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 20 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen, a writing tablet, or the like. These and other input devices are often connected to the processing unit 120 through a user input interface 160 that is coupled to the system bus, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets, and the Internet.

When used in a LAN networking environment, the computer 110 is connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Database Deployment

Figure 2:
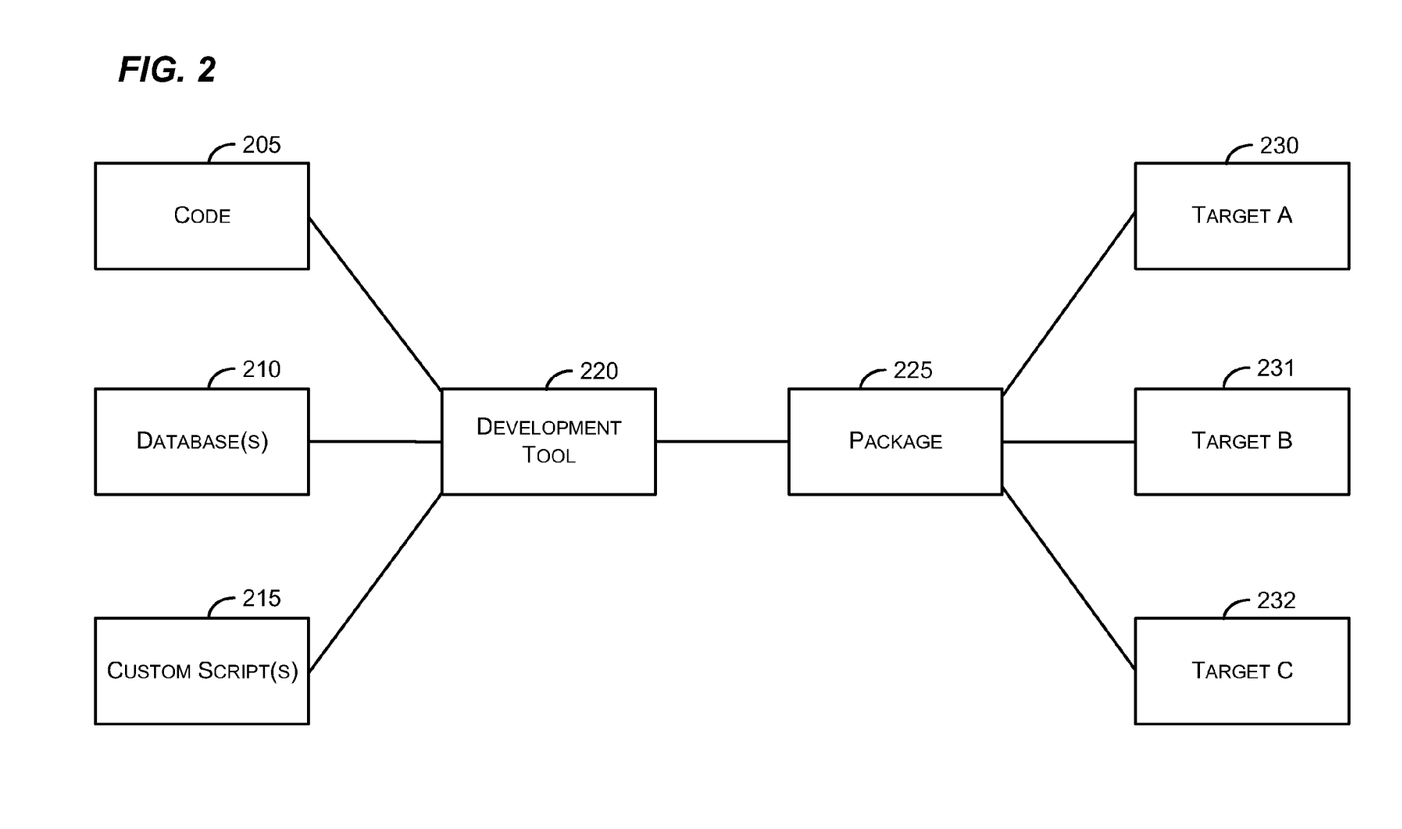
FIG. 2 is a block diagram representing an exemplary environment in which aspects of the subject matter described herein may be implemented.

As mentioned previously, ensuring that an application and appropriate schema information and data from its database are deployed correctly is a challenge. FIG. 2 is a block diagram representing an exemplary environment in which aspects of the subject matter described herein may be implemented. The environment may include code 205, one or more databases 210, one or more custom scripts 215, a development tool 220, a package 225, targets 230-232, and may include other entities (not shown). The various entities may be located relatively close to each other or may be distributed across the world.

The various entities may communicate with each other via various networks including intra- and inter-office networks, one or more local area networks, wide area networks, direct connections, virtual connections, private networks, virtual private networks, some combination of the above, and the like.

The code 205 includes instructions that indicate actions a computer is to take. The code 205 may also include data, resources, variables, definitions, relationships, associations, and the like that include information other than actions the computer is to take. For example, the code may include images, Web pages, HTML, XML, other content, and the like. In an embodiment, the code may be included in a software project. A software project may include or reference the code, the other information indicated above, configuration information, and the like.

Actions indicated by the code 205 may be encoded in a source code language, intermediate language, assembly language, binary code, some combination of the above, and the like.

The one or more databases 210 (hereinafter referred to as the databases 210) may comprise relational databases, object-oriented databases, hierarchical databases, network databases, other types of databases, some combination or extension of the above, and the like. Data stored in a database may be organized in tables, records, objects, other data structures, and the like. The data stored in a database may be stored in dedicated database files, dedicated hard drive partitions, HTML files, XML files, spreadsheets, flat files, document files, configuration files, other files, and the like. A database may reference a set of data that is read-only to the database or may have the ability to read and write to the set of data.

Data in a database may be accessed via a database management system (DBMS). A DBMS may comprise one or more programs that control organization, storage, management, and retrieval of data of a database. A DBMS may receive requests to access data in a database and may perform the operations needed to provide this access. Access as used herein may include reading data, writing data, deleting data, updating data, a combination including two or more of the above, and the like.

In describing aspects of the subject matter described herein, for simplicity, terminology associated with relational databases is sometimes used herein. Although relational database terminology is sometimes used herein, the teachings herein may also be applied to other types of databases including those that have been mentioned previously.

The one or more custom scripts 215 (hereinafter referred to as the scripts 215) represent actions that may be executed to modify the schema or other data of a database. The scripts 215 may be coded by hand (e.g., via a development tool, a text editor, or the like), machine generated, or may be created by a combination of hand coding and machine generation.

As mentioned above, a script may modify a schema or other data of a database. A schema of a database specifies the structure of the database. For example, when referring to a relational database, a schema may indicate attributes of fields, tables, indexes, keys, and the like. The term "other data" refers to data in the database other than the structure of the database. For example, other data includes data that is included in tables of a database. For example, other data may include employee data, company data, sales data, other data, or the like as represented in a database.

The package 225 may include code, database schema, database data, and/or custom scripts. One purpose of the package 225 is to combine the code, database data, and scripts in a deployment unit so that deploying the package causes both the code and the database data to be installed or updated on a target as needed. The package 225 may be a self-extracting file or files, a set of one or more files that are not self-extracting, an in-memory representation of the code, database data, and/or custom scripts, and the like. In another embodiment, the package 225 may be a set of files. In one embodiment, the package 225 may include an installation component in charge of installing items in the package on a target. In another embodiment, an installation component (sometimes referred to as an "installer") may reside on the target and may be excluded from the package 225.

An installer may include code that is able to detect what components are already installed on a particular target. Data in the package 225 may be used to detect whether the needed databases for the code of the package 225 exist on the target, and, if so, whether they are appropriate for the version for code included in the package 225. If a database does not exist, the package 225 may be used to install and populate the database. In addition, the package 225 may also include one or more scripts to execute to upgrade or downgrade any existing database to a version appropriate for use with the code installed by the package 225.

The development tool 220 comprises a component used to develop and/or deploy software. As used herein, the term component is to be read to include all or a portion of a device, a collection of one or more software modules or portions thereof, some combination of one or more software modules or portions thereof and one or more devices or portions thereof, and the like. In one exemplary embodiment, the development tool may comprise an integrated development environment (IDE) that allows a software developer to enter and update code, debug code, create and update databases, associate the code with one or more databases, compile the code, create a package, do other actions, and the like.

The development tool 220 may invoke one or more processes to perform various actions. The term "process" and its variants as used herein may include one or more traditional processes, threads, components, libraries, objects that perform tasks, and the like. A process may be implemented in hardware, software, or a combination of hardware and software. In an embodiment, a process is any mechanism, however called, capable of or used in performing an action. A process may be distributed over multiple devices or located on a single device.

In operation, the development tool 220 may use the code 205, the databases 210, and the scripts 215 to create the package 225. In particular, the development tool 220 may place the code 205 or code derived therefrom together with database data (e.g., schema data and other data from the databases 210) and the scripts 215 or code derived therefrom into the package 225.

In one embodiment, the development tool 220 may generate scripts (e.g., SQL scripts) that, when executed, create database structure and populate the database structure. These scripts may then be placed into the package 225.

In another embodiment, the development tool 220 may extract database data from the databases 210 and represent the data in the form of flat files, tables, XML data, other data, or the like. This extracted data may then be placed into the package 225.

After the package 225 is created, the package 225 may then be deployed on one or more targets (e.g., the targets 230-232) as desired. In deploying the package 225 on a target, code may be installed and the databases may be created and/or updated. The code and one or more of the databases may be installed on the same machine or on different machines connected via a network. The scripts 215 in the package 225 may also be executed to update the databases. In one embodiment, to install a package, the package is transferred as a unit to the target, the package is stored on the target, and then the package is deployed. In another embodiment, to install a package, a connection may be established with the target and the package may be transferred as a stream. In these embodiments, the package may be installed after the entire stream is received or installation of the package may commence as various portions of the package are received. For example, code installation may begin before database scripts are completely transferred.

The targets 230-232 may comprise virtual or physical targets. The term virtual target includes an environment or a portion thereof that is simulated or emulated by a computer. For example, when a machine is simulated or emulated at the hardware level, the resulting entity is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual CD, may communicate via a virtual network adapter, and so forth. Although a virtual machine is one suitable virtual target, other exemplary virtual targets include virtual environments in which operating systems or portions thereof may be emulated or simulated.

A physical target may comprise or reside on one or more computing devices. Such devices may include, for example, personal computers, server computers, hand-held or laptop devices, multiprocessor systems, microcontroller-based systems, set-top boxes, programmable consumer electronics, network PCs, minicomputers, mainframe computers, cell phones, personal digital assistants (PDAs), gaming devices, printers, appliances including set-top, media center, or other appliances, automobile-embedded or attached computing devices, other mobile devices, distributed computing environments that include any of the above systems or devices, and the like. An exemplary device that may be configured to act as one of the above comprises the computer 110 of FIG. 1.

Although the environment described above includes various numbers of the entities, it will be recognized that more, fewer, or a different combination of these entities and others may be employed without departing from the spirit or scope of aspects of the subject matter described herein.

Figure 3:
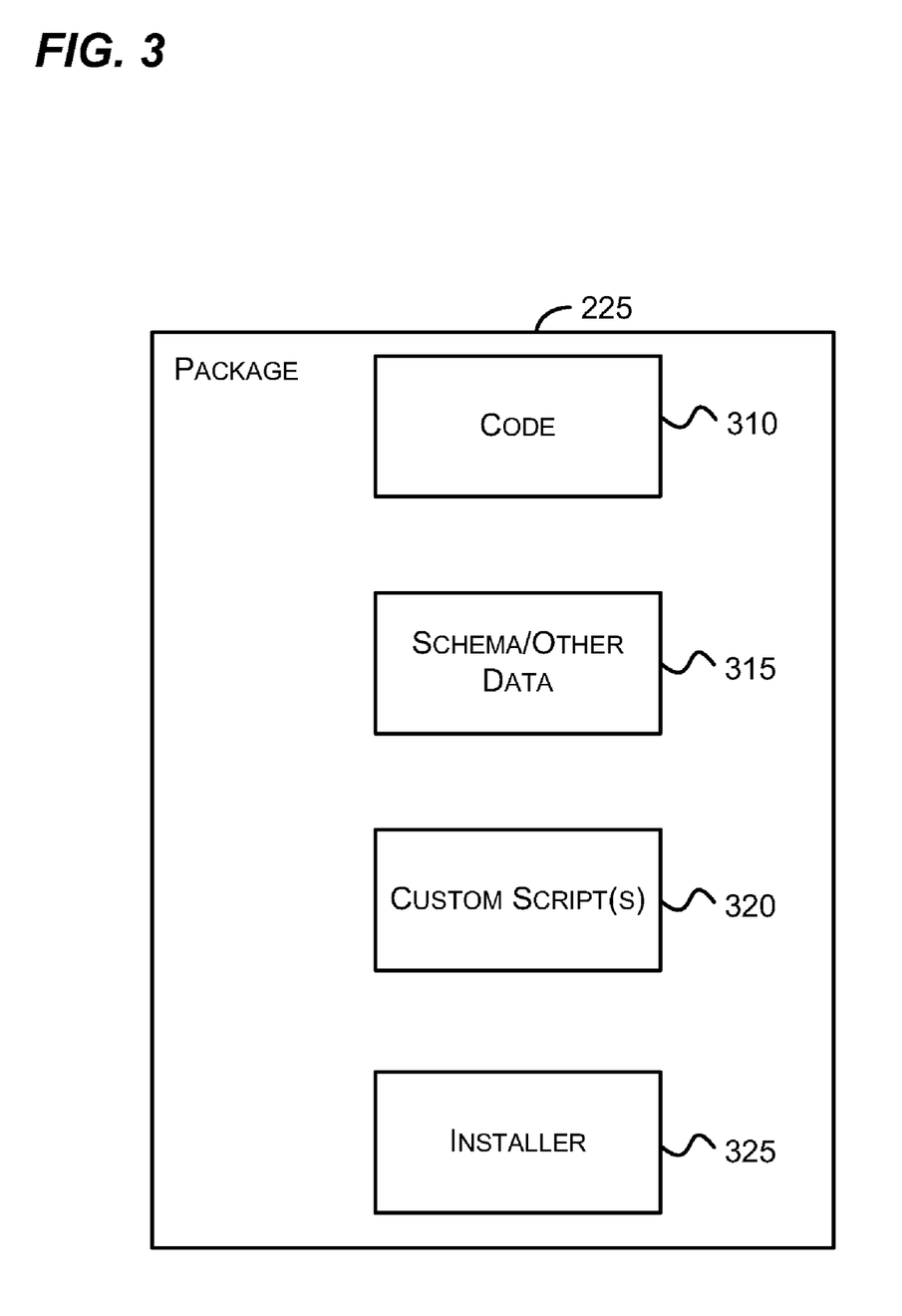
FIG. 3 is a block diagram illustrating an exemplary package in accordance with aspects of the subject matter described herein.

FIG. 3 is a block diagram illustrating an exemplary package in accordance with aspects of the subject matter described herein. As illustrated, the package 225 may include code 310, schema/other data 315, one or more custom scripts 320, an installer 325, and other data (not shown). The code 310 may include or be derived from the code 205 of FIG. 2. Similarly the schema/other data 315 may be determined from the databases 210, while the one or more custom scripts 320 may include or be derived from the custom scripts 215.

Each of the code 310, the schema/other data 315, one or more custom scripts 320, and the installer 325 are optional. For example, in many cases, the installer 325 may be excluded from the package 225 as an installer may be assumed to reside on a target. In various packages, there may be one or more of the above without departing from the spirit or scope of aspects of the subject matter described herein.

Figure 4:
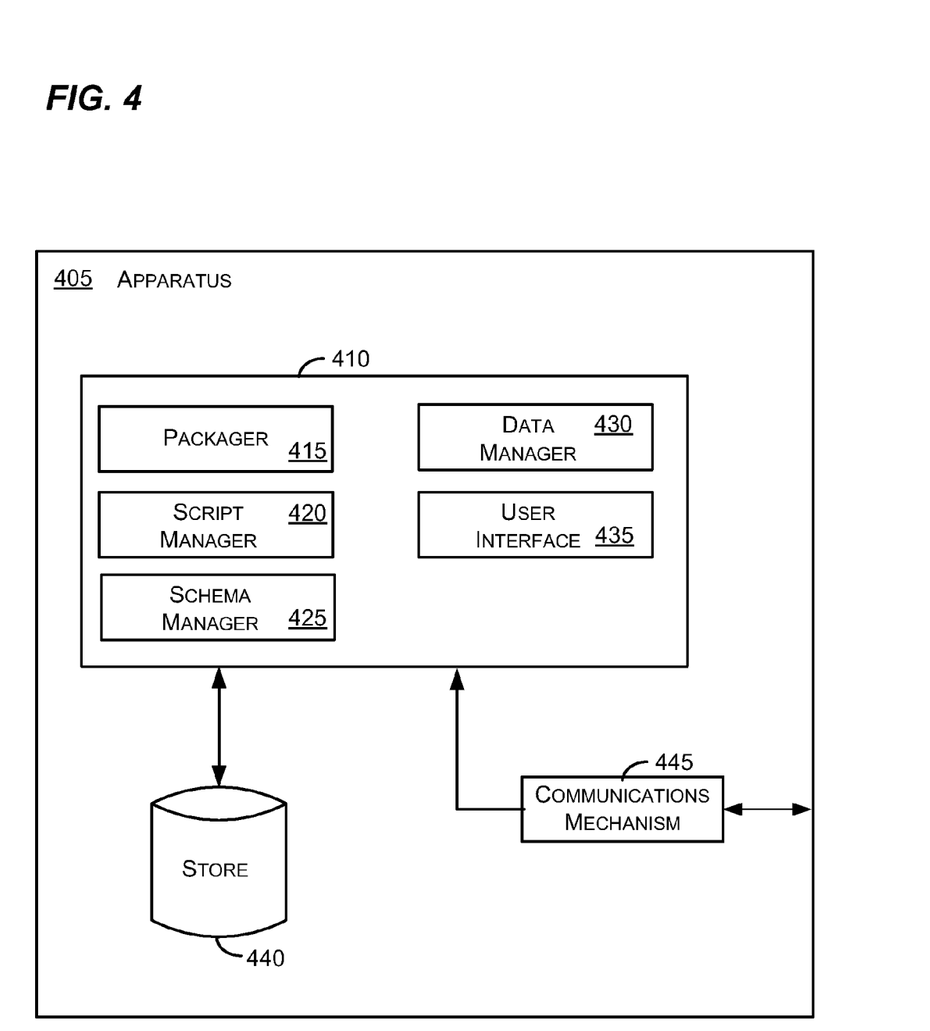
FIG. 4 is a block diagram that represents an apparatus configured in accordance with aspects of the subject matter described herein.

FIG. 4 is a block diagram that represents an apparatus configured in accordance with aspects of the subject matter described herein. The components illustrated in FIG. 4 are exemplary and are not meant to be all-inclusive of components that may be needed or included. In other embodiments, the components and/or functions described in conjunction with FIG. 4 may be included in other components (shown or not shown) or placed in subcomponents without departing from the spirit or scope of aspects of the subject matter described herein. In some embodiments, the components and/ or functions described in conjunction with FIG. 4 may be distributed across multiple devices.

Turning to FIG. 4, the apparatus 405 may include packaging components 410, a store 440, a communications mechanism 445, and other components (not shown). The apparatus 405 may host the development tool 220 and may have access to the code 205, the databases 210, and the custom scripts 215 of FIG. 2. The apparatus 405 may be implemented on or as a computer (e.g., as the computer 110 of FIG. 1).

The packaging components 410 may be included as part of the development tool 220 or may be separate from the development tool 220 of FIG. 2. The packaging components 410 may include a packager 415, a script manager 420, a schema manager 425, a data manager 430, a user interface 435, and other components (not shown). In one embodiment, the schema manager 425 and the data manager 435 may be combined in a single component.

The communications mechanism 445 allows the apparatus 405 to communicate with other entities. For example, the communications mechanism 445 may allow the apparatus to communicate with the targets 230-232. The communications mechanism 445 may be a network interface or adapter 170, modem 172, or any other mechanism for establishing communications as described in conjunction with FIG. 1.

The store 440 is any storage media capable of storing data involved with a package. The store 440 may comprise a file system, database, volatile memory such as RAM, other storage, some combination of the above, and the like and may be distributed across multiple devices. The store 440 may be external, internal, or include components that are both internal and external to the apparatus 405.

The data manager 430 is operable to obtain data from one or more source databases associated with code of a software project. Although schema information may be represented as data, the data the data manager 430 is operable to obtain is data other than the schema information. In a development environment, the code of the software project may be configured to access the source databases.

In being operable to obtain data from the databases, the data manager 430 may be operable to obtain records from the source databases. As used herein, a record is to be read broadly as to include a set of related data. For example, in a relational database, the records may correspond to rows within one or more tables of the database.

The schema manager 425 is operable to obtain schema information about the one or more source databases. The schema information may include structure information regarding a layout of the data in the source databases. The schema information obtained by the schema manager 425 may indicate database operations to perform on a target database in conjunction with installing the code on the target. In a relational database, the database operations may include creating tables, indexes, records, other relational operations, and the like.

The script manager 420 is operable to obtain one or more scripts indicating database operations to perform for the target database in conjunction with installing the code on the target. As mentioned previously, the script manager 420 may determine the one or more scripts to obtain via a file that includes references to other scripts outside the file. In this case, the script manager 420 may be further operable to obtain the other scripts reference by the file.

The packager 415 is operable to determine whether to make requests to the data manager 430, the schema manager 425, and the script manager 420. For example, when a user has indicated that there are no custom scripts, the packager 415 may forgo requesting the script manager 420 to obtain scripts. Likewise, if the user has indicated that the data of a source database does not need to be moved to a target database, the packager 415 may forgo making requests of the data manager 430 and the schema manager 425.

The packager 415 may be further operable to determine package data to place in a package based on one or more responses from the data manager 430, the schema manager 425, and the script manager 420. Furthermore, when an installer is needed in the package (e.g., when no installer exists on the target), the packager 415 may place an installer in the package. An installer (whether included in the package or residing on the target), when executed, may update the target database with the data from the source database, may create and/or updates the target database with the schema information, and may execute any scripts as appropriate.

The user interface 435 is operable to receive input that indicates whether to obtain the schema information via the schema manager 420, whether to obtain the data via the data manager 430, and a file location from which the script manager 420 may obtain one or more scripts.

Figure 5:
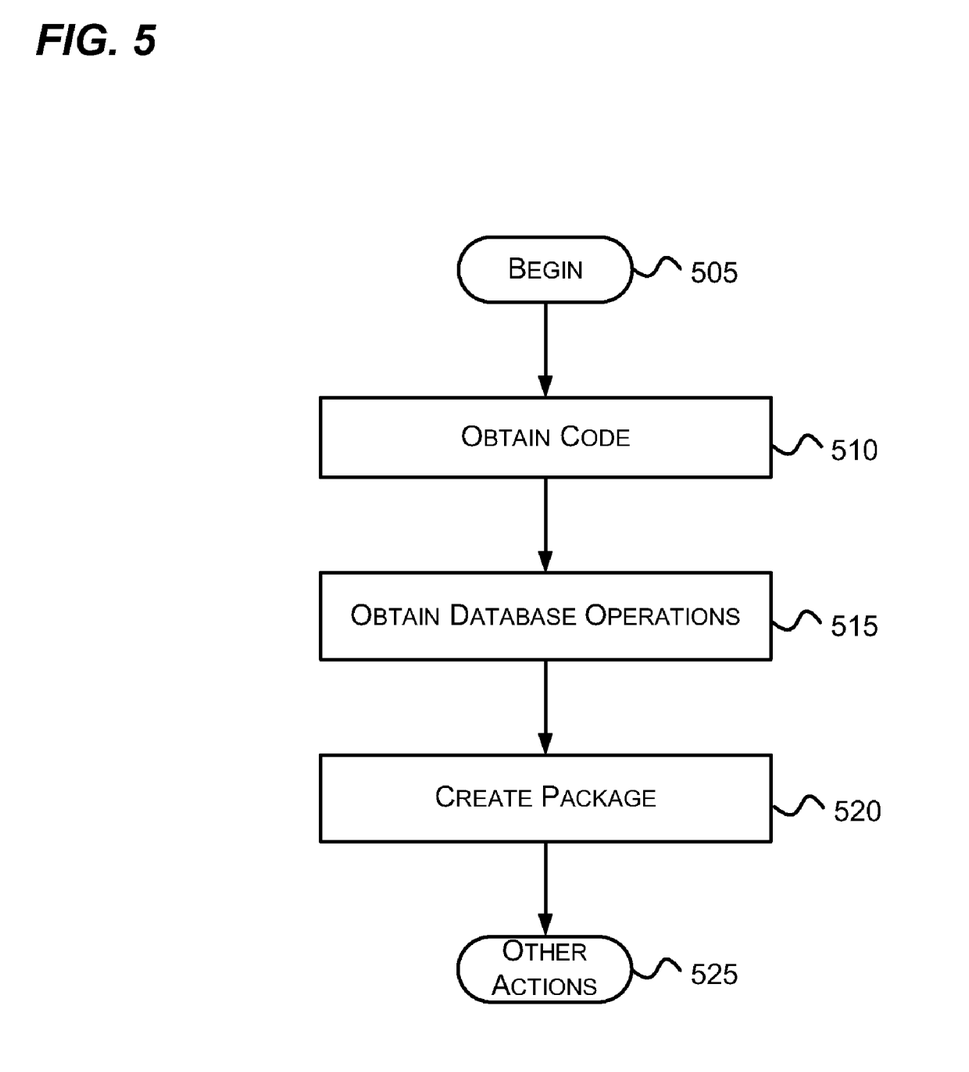
FIG. 5 is a flow diagram that represents exemplary actions that may occur in creating a package in accordance with aspects of the subject matter described herein.
Figure 6:
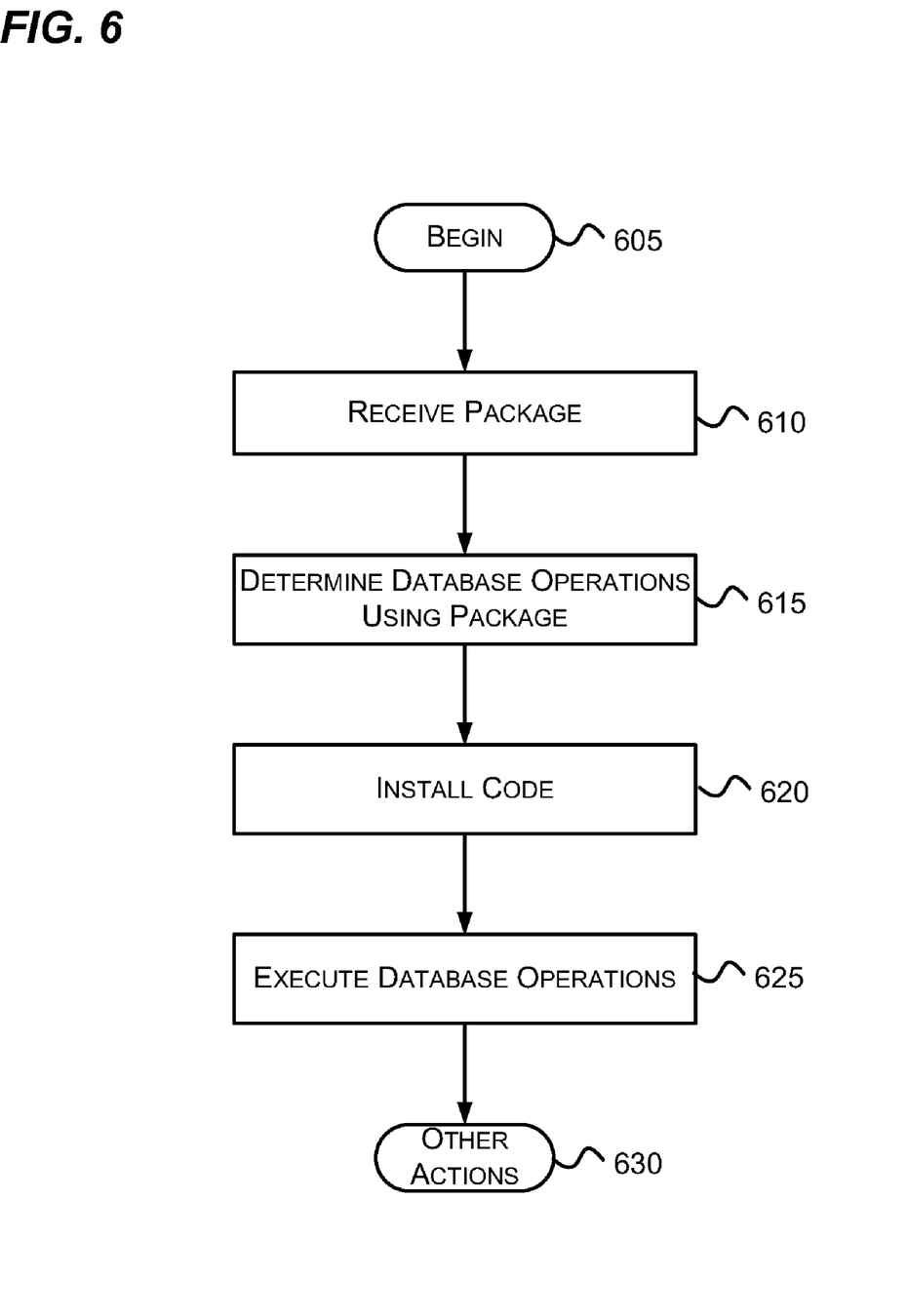
FIG. 6 is a flow diagram that represents exemplary actions that may occur in installing a package in accordance with aspects of the subject matter described herein.

FIGS. 5-6 are flow diagrams that generally represent actions that may occur in accordance with aspects of the subject matter described herein. For simplicity of explanation, the methodology described in conjunction with FIGS. 5-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 5 is a flow diagram that represents exemplary actions that may occur in creating a package in accordance with aspects of the subject matter described herein. Turning to FIG. 5, at block 505, the actions begin. For example, referring to FIG. 4, a user may indicate via the user interface 435 that a package is to be created. As another example, another event (e.g., such as a nightly build of a project) may trigger the creation of a package.

At block 510, code associated with a software project is obtained. For example, referring to FIG. 2, the development tool 220 may obtain the code 205. Obtaining may include retrieving the code from volatile (e.g., RAM) and/or non-volatile (e.g., a hard disk) memory. The code when executed in a first environment interacts with a first database. The first database may be the database used to develop or test the code, for example.

At block 515, an indication is received of database operations to perform in conjunction with installing the code on a target entity. For example, referring to FIG. 4, a user interface 435 may receive an indication that a new database is to be created as well as locations of custom scripts to execute. The database operations are to be performed with reference to a second database (e.g., a target database of the target entity) that is accessible via the code when the code is executed on the target entity.

An indication of database operations to perform may include various things. For example, the indication may include an indication to create the second database in conjunction with installing the code on the target entity. As another example, the indication may include a location of a file, where the file indicates actions to perform with respect to the second database. The file may indicate database operations and/or may indicate the locations of additional files that include additional actions (e.g., via scripts) to perform with respect to the second database.

As another example, the indication may include an indication that a schema of the first database is to be used to create the second database on the target entity. As another example, the indication may include an indication that data of the first database is to be used to update data of the second database on the target entity. In one example, the indication may include both that a schema of the first database is to be used to create the second database on the target entity and that data of the first database is to be used to update data of the second database on the target entity.

In one embodiment, the database operations may be created by determining differences between the first and second databases and encoding the differences in the database operations. In this way, the second database may be updated with just the differences instead of being re-created. In another embodiment, the database operations may include operations that delete all or a portion of the second database in conjunction with updating the second database with schema and other data from the first database.

In deploying the package, a version of the second database may be detected. After the version has been detected, the second database may be updated (e.g., upgraded or downgraded) to a version consistent with the code (e.g., the version of the first database used when creating the package).

At block 520, a package is created that includes the code and data that encodes the database operations. For example, referring to FIG. 410, the packager 415 may place the code and data into a package. Where a target is unlikely to have an installer, creating the package may include creating an executable file that, if executed, installs the code and executes the database operations encoded in the data. The package may include one or more files.

At block 525, other actions, if any, may be performed.

FIG. 6 is a flow diagram that represents exemplary actions that may occur in installing a package in accordance with aspects of the subject matter described herein. Turning to FIG. 6, at block 605, the actions begin. For example, referring to FIG. 2, when the package 225 is transmitted to the targets 230, the target 230 actions of FIG. 6 may begin.

At block 610, the package is received. For example, referring to FIG. 2, the target 230 may receive the package 225 or a portion thereof. In one embodiment, when the package 225 is transmitted as a stream, the target 230 may begin installing the package as the data in the stream arrives. As mentioned previously, the package received may potentially include code, a database schema, database data, and a database script, the code associated with a software project. At least some of the code, when executed, is arranged to access a first database of a source entity (e.g., a development, test, or other environment).

At block 615, from the package, database operations are determined to perform in conjunction with installing the code on a target entity. For example, referring to FIG. 2, the target 230 may determine database operations from the package 225. The database operations are to be performed with reference to a second database associated with the target entity. The database operations include instructions to arrange the second database to be consistent with the code. "Consistent" in this sense means that the code, when installed on the target entity, can access the second database like the code could access the first database on the source entity.

At block 620, the code is installed on the target entity. For example, referring to FIG. 2, the code 205 is installed on the target 230.

At block 625, the determined database operations are performed. For example, referring to FIG. 2, the database operations previously determined are executed with respect to a database associated with the target 230. Executing the database operations may include one or more of creating the target database, populating the target database with the database data, applying changes to the target database to upgrade or downgrade a version of the target database to be consistent with a version of the source database, executing the database script, other operations, and the like.

At block 630, other actions, if any, are performed.

As can be seen from the foregoing detailed description, aspects have been described related to integrated database deployment. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-implemented method comprising:
obtaining, by a computing device, code of a software project in a development environment, wherein the code of the software project, when executed in the development environment, accesses a source database of the development environment;
obtaining schema information for the source database;
obtaining data of the source database;
generating one or more scripts encoding database operations to perform for deploying the code of the software project on a target entity, wherein:
the one or more scripts, when executed on the target entity, create a database structure of a target database based on the schema information for the source database and update the target database based on the data of the source database, and
the code of the software project, when executed on the target entity, accesses the target database; and
creating, by the computing device, a package for deploying the software project to the target entity, the package including the code of the software project and the one or more scripts encoding the database operations to perform for deploying the code of the software project on the target entity.

2. The method of claim 1, wherein:
the one or more scripts, when executed on the target entity, populate the target database based on the data of the source database in conjunction with installing the code of the software project on the target entity.

3. The method of claim 1, further comprising:
receiving one or more custom scripts indicating actions to perform on the target database.

4. The method of claim 3, wherein the one or more custom scripts that indicate actions to perform on the target database are included in the package.

5. The method of claim 4, wherein the one or more custom scripts modify the schema information for the source database that is used to create the database structure of the target database.

6. The method of claim 1, wherein the data of the source database corresponds to rows within one or more tables of the source database.

7. The method of claim 6, wherein the one or more scripts, when executed on the target entity:
update rows within one or more tables of the target database based on the data of the source database.

8. The method of claim 1, wherein the package comprises an executable file that installs the code of the software project on the target entity and executes the one or more scripts included in the package.

9. The method of claim 1, further comprising:
determining differences between the source database and the target database; and
generating one or more scripts encoding the differences for updating the target database.

10. The method of claim 1, further comprising:
detecting a version of the target database; and
generating one or more scripts to update the version of the target database to a version of the source database.

11. The method of claim 1, wherein the package includes the schema information for the source database and the data of the source database.

12. A computer storage medium storing computer-executable instructions implementing the method of claim 1.

13. A computing device comprising:
a processing unit for executing computer-executable components; and
memory storing computer-executable components including:
a development environment including a software project and a source database associated with the software project, the software project including code configured to access the source database when executed in the development environment;
a schema manager to obtain schema information for the source database;
a data manager to obtain data of the source database;
a script manager to generate one or more scripts encoding database operations to perform for deploying the code of the software project on a target entity, wherein:
the one or more scripts, when executed on the target entity, create a database structure of a target database based on the schema information for the source database and update the target database based on the data of the source database, and the code of the software project, when executed on the target entity, accesses the target database; and a packager to create a package for deploying the software project to the target entity, the package including the code of the software project and the one or more scripts encoding the database operations to perform for deploying the code of the software project on the target entity.

14. The computing device of claim 13, wherein the script manager determines one or more scripts to obtain via a file including references to scripts outside of the file.

15. The computing device of claim 13, wherein the data correspond to rows within one or more tables of the source database.

16. The computing device of claim 13, wherein the schema information for the source database comprises structure information regarding a layout of data in the source database.

17. The computing device of claim 13, wherein the script manager receives one or more custom scripts indicating actions to perform on the target database.

18. The computing device of claim 13, wherein the computer-executable components include:

a user interface to receive an indication to obtain the data of the source database and the schema information for generating the one or more scripts.

19. The computing device of claim 13, wherein the package comprises install code that, when executed on the target entity, installs the code of the software project on the target entity and executes the one or more scripts included in the package.

20. A computer storage medium storing computer-executable instructions that, when executed by a computing device, cause the computing device to perform actions comprising:

receiving, from a source entity, a package that includes code of a software project and one or more scripts encoding databases operations to perform for deploying the code of the software project on the computing device, wherein:

the code of the software project, when executed by the source entity, accesses a source database of the source entity, and the one or more scripts, when executed by the computing device, create a database structure of a target database based on schema information for the source database and update the target database based on data of the source database; and deploying, on the computing device, the code of the software project from the package by:

installing the code of the software project on the computing device, executing the one or more scripts to create the database structure of the target database based on the schema information for the source database and update the target database based on the data of the source database, and executing the code of the software project on the computing device to access the target database.

* * * * *